(12) United States Patent
Jacob

(10) Patent No.: US 6,266,457 B1
(45) Date of Patent: Jul. 24, 2001

(54) SYSTEM AND METHOD FOR DIFFERENTIAL GROUP DELAY COMPENSATION

(75) Inventor: John M. Jacob, Plano, TX (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/412,916

(22) Filed: Oct. 5, 1999

(51) Int. Cl.[7] .................................................. G02B 6/00
(52) U.S. Cl. ............................ 385/11; 385/12; 359/156; 359/161
(58) Field of Search .................................. 385/11, 12, 31, 385/14, 15, 24; 359/122, 154, 156, 161, 188, 189

(56) References Cited

U.S. PATENT DOCUMENTS 5,822,100 * 10/1998 Robinson et al. .................... 359/156
5,930,414 * 7/1999 Fishman et al. ...................... 385/11

* cited by examiner

*Primary Examiner*—Cassandra Spyrou
*Assistant Examiner*—Euncha Cherry

(57) ABSTRACT

An exemplary system and method for differential group delay compensation are provided that include a method for differential group delay compensation of an optical signal that increases overall bandwidth and reduces the bit-error-rate of a fiber optic transmission system. The method includes generating a translated polarization signal by translating the wavelength of either or both of a leading polarization signal and a trailing polarization signal of an optical signal. The wavelength(s) is translated by an amount that is related to the delay between the leading polarization signal and the trailing polarization signal. The translated polarization signal may then be introduced, along with the other polarization signal, to an optical fiber, such as a dispersion compensating fiber with high chromatic dispersion, that has the optical property of a group delay that varies with wavelength. This results in the generation of a differential group delay compensated optical signal.

43 Claims, 6 Drawing Sheets

SYSTEM AND METHOD FOR DIFFERENTIAL GROUP DELAY COMPENSATION

BACKGROUND

This invention relates in general to the field of telecommunications and fiber optic transmission systems and more particularly to a system and method for differential group delay compensation.

Fiber optics technology and fiber optic transmission systems are revolutionizing telecommunications. The main driving force behind this revolution is the promise of extremely high communications bandwidth. A single beam of modulated laser light can carry vast amounts of information that is equal to literally hundreds of thousands of phone calls or hundreds of video channels. Over the past few years, this technology has advanced at such a pace that the bandwidth capabilities have more than doubled every two years. The bandwidth strides have come about through major milestones, breakthroughs, and improvements in various areas such as fiber optic materials and transmitter devices. As a result, bandwidth capability, which may be expressed in terms of a digital bits per second ("bps") rate, has escalated. In some cases, for example, bandwidth has increased from 500 Mbps to 10 Gbps.

In a fiber optic transmission system, a digital signal is represented by an optical signal by modulating a laser light or rapidly turning a laser light on and off to represent the various "1" and "0" or "on" and "off" values or states of a digital signal. This may be referred to as amplitude modulation. The laser light, or optical signal, is generally emitted from a laser of an optical transmitter. In the frequency domain, this signal includes numerous frequency components spaced very closely about the nominal center frequency of the optical carrier, such as, for example, 193,000 GHz.

An optical signal is transmitted in a fiber optic transmission system using, generally, an optical transmitter, which includes a light source or laser, an optical fiber, an optical amplifier, and an optical receiver. A modulated optical signal arriving at an optical receiver must be of sufficient quality to allow the receiver to clearly distinguish the on-and-off pattern of light pulses sent by the transmitter. Noise, attenuation, and dispersion are a few of the impairments that can distort an optical signal and render the optical signal marginal or unusable at the receiver. The distortion of an optical signal makes it extremely difficult or impossible for an optical receiver to accurately detect or reconstitute the digital signal. This is because distortion nonuniformly broadens, spreads, or widens the various light pulses resulting in such closely spaced pulses or overlapping pulses that the pulses are virtually indistinguishable from one another.

Conventionally, a properly designed optical link or channel can maintain a Bit Error Rate ("BER") of $10^{-13}$ or better. When an optical channel degrades to a BER of $10^{-8}$, a telecommunications system may automatically switch to an alternate optical channel in an attempt to improve the BER. Otherwise, the optical channel must operate at a reduced or lower bandwidth, which harms overall system performance. Dispersion is a major contributor to distortion of an optical signal, which increases the BER of the optical signal or channel. The distortion caused by dispersion generally increases as the bandwidth or data rate increases and as the optical fiber transmission distance increases.

Dispersion has generally been identified as being caused by (1) chromatic dispersion, or (2) Polarization Mode Dispersion ("PMD"). Until relatively recently, chromatic dispersion received the far greater attention because its adverse effects were initially more limiting at the then available bandwidth and data rate that was considered the leading edge in a fiber optic transmission system. Now, it has been recognized that PMD is one of the limiting factors that must be overcome to take telecommunications and fiber optic transmission systems to the next level and to continue with the heretofore rapid increase and expansion of bandwidth and data rates.

Chromatic dispersion occurs when the various frequency components or colors that make up a pulse of laser light travel at different speeds through an optical fiber and arrive at the optical receiver at different times. This occurs because the index of refraction of a material, such as an optical fiber, varies with frequency or wavelength. As a result, the various pulses of light that make up an optical signal are distorted through pulse spreading, making it difficult or impossible to accurately receive and recover the digital data contained in the optical signal.

Some of the major milestones, breakthroughs, and improvements that solved and/or reduced many of the problems caused by chromatic dispersion have included: (1) single-mode propagation, (2) Distributed Feedback ("DFB") laser with narrow output spectra, and (3) the development of low attenuation/modified-dispersion optical fiber. All of these advances have contributed to increased bandwidth by allowing an optical signal to pass through an optical fiber with relatively low or reduced dispersion, and hence, relatively low or reduced optical signal distortion.

Single-mode propagation was achieved through the development of single-mode optical fiber. This optical fiber allows only a single mode of light to propagate through the fiber. The DFB laser provides a light source to use with single-mode optical fibers. The DFB laser produces a light with an extremely narrow distribution of output frequencies and wavelengths. This minimizes the chromatic dispersion problem caused by the fact that different wavelengths travel at slightly different speeds through a fiber. The low attenuation/modified-dispersion optical fiber provides a dispersion-shifted optical fiber that minimizes the speed-vs-wavelength dependency at a specific wavelength, such as 1550 nm.

Unfortunately, no corresponding major milestones, breakthroughs, and improvements have been achieved to solve and/or significantly reduce the substantial problems and limitations caused by PMD. PMD was previously insignificant relative to the other dispersion effects but now is a limiting factor. As a result, PMD now serves as a major limitation to the continued advancement and improvement in bandwidth and data rates for fiber optic transmission systems. PMD causes, among other problems, a first order effect that is referred to as Differential Group Delay ("DGD"). DGD refers to the fact that the two polarization states or modes of an optical signal, which are orthogonal to one another, are delayed relative to each other resulting in a leading polarization signal and a trailing polarization signal. This delay distorts the optical signal and limits the ability of a fiber optic transmission system to operate at a higher bandwidth and data rate.

It is well known that light can be polarized and that, for a given beam of light, this polarization may be expressed in terms of two orthogonal axes that are normal to the axis of propagation. Each of the two principal polarization modes may be expressed as polarization signals. As an optical signal or beam of light propagates through an optical fiber, birefringence causes the two polarization signals to travel or propagate at different speeds. This results in one of the two polarization signals leading the other polarization signal. Thus, there becomes a leading and a trailing polarization signal. As with chromatic dispersion, this speed difference in the two polarization signals causes pulse broadening and restricts the usable bandwidth of each optical carrier.

In many optical fibers, not only is birefringence present, but the birefringence is nonuniform and is randomly varying throughout the optical fiber. The PMD within a given optical fiber changes as a function of time, temperature, and various other factors. This results not only in the two polarization signals traveling at different speeds, but in the continual realignment or reorientation of the principal states of polarization. This is because the orientation of the refractive index in the optical fiber randomly or continually changes as the optical signal propagates through the optical fiber. As a result, the light energy present along one such polarization may leak into the other polarization.

This PMD effect can be, for example, on the order of 10–20 picoseconds in a 100 km optical fiber. This is significant when the modulating pulses are 25–100 ps in width, which are common at higher data rates and planned data rates. Because birefringence is randomly varying, a PMD compensator or DGD compensator must monitor and adapt to the changes so as to keep DGD to a minimum.

PMD may be caused by a number of things such as, for example, asymmetrical fiber optic transmission media, mechanical stresses and strains applied to the fiber optic media, and other physical phenomena such as temperature gradients and changes. PMD is not static, but is dynamic and changes over time. For example, an optical splice may change the birefringence of an optical fiber, and hence the PMD and DGD. Similarly, birefringence in an optical fiber varies over time due to various factors such as fiber aging, and due to temperature and pressure changes along the fiber. A fiber installed above ground can exhibit fairly rapid fluctuations in PMD due to temperature and mechanical forces (e.g., wind blowing the fiber). A fiber buried underground can be sensitive to loads such as street traffic or construction work. Also, the fiber may not have a perfect circular cross-section or may have a distorted cross-section because of manufacturing defects or because of mechanical stresses and strains, such as when the fiber is stapled, attached, or fastened during installation. This causes varying delays of the polarization components.

One approach to actively correct for PMD and DGD is the use of mechanical delay lines. Unfortunately, this only allows for continuous delay up to a specified limit allowing for exact DGD compensation. The drawback of this technique is that it requires a mechanical translation device. The speed, cost, and mechanical reliability of these devices are undesirable.

A more common approach uses a fixed delay line by aligning the principal states of polarization to the fast and slow optical axes of polarization maintaining fiber ("PMF"). The drawback of this technique is that it is fixed and can only compensate for exactly one value of DGD when, in fact, we know that birefringence is randomly varying. PMD is statistical in nature so that the amount of induced DGD varies with time. If the value of DGD differs from the fixed delay in the PMF, the PMDC will only partially compensate for the adverse effects of DGD.

The effect of PMD is one of the dominant limitations to overcome in deploying OC-192 transport systems in fiber optic transmission systems. Furthermore, the deployment of OC-768 transport systems will not be possible without active PMD Compensation ("PMDC") devices. Fixed delay DGD compensation techniques and mechanically implemented techniques are limited and will not be sufficient for higher bandwidth systems.

SUMMARY

From the foregoing it may be appreciated that a need has arisen for a system and method for differential group delay compensation that automatically corrects or minimizes the effects of PMD, including DGD. In accordance with the present invention, a system and method for differential group delay compensation are provided that substantially eliminate one or more of the disadvantages and problems outlined above.

According to one aspect of the present invention, a method for differential group delay compensation of an optical signal in a fiber optic transmission system is provided that includes generating a translated polarization signal by translating the wavelength of at least one of a leading polarization signal and a trailing polarization signal of the optical signal. The polarization signal is translated by an amount related to a delay between the leading polarization signal and the trailing polarization signal, and may also be related to the group delay chromatic dispersion properties of an optical fiber described below. The translated polarization signal, after being combined, in one embodiment, to the nontranslated polarization signal, is introduced to the optical fiber, such as a dispersion compensating fiber, that has a known optical property of chromatic dispersion group delay that varies with wavelength. The optical fiber generates a differential group delay compensated optical signal in response.

The present invention provides a profusion of technical advantages that include the capability to efficiently and effectively compensate for first order effects of PMD in a fiber optic telecommunications system. This allows such a system to operate at an even higher bandwidth and data rate.

Another technical advantage of the present invention is the capability to provide automatic and variable PMD compensation so that any changes in the PMD of a fiber optics transmission system may be further compensated. This significantly minimizes or eliminates the adverse effects of PMD by accurately compensating for PMD effects, which often vary with time and operating conditions.

Yet another technical advantage of the present invention includes decreased BER in a fiber optics telecommunications system. This allows such a system to operate at a greater bandwidth and data rate.

Still another technical advantage of the present invention includes the capability to provide automatic, variable, and accurate PMD compensation without the need for fixed delay lines or variable delay lines that often require mechanical implementations such as mechanical actuators and the like. This technical advantage increases overall reliability and accuracy by eliminating often inaccurate fixed delay lines and unreliable or less reliable mechanical implementations.

The present invention provides the technical advantage and flexibility of allowing PMD to be compensated by either: (1) delaying a leading polarization signal in relation to its trailing polarization signal, (2) advancing a trailing polarization signal in relation to its leading polarization signal, or (3) both delaying a leading polarization signal and advancing a leading polarization signal, relative to each other. Previous PMD compensation systems generally only allowed the leading polarization signal to be delayed.

Still another technical advantage that the present invention provides includes the capability to operate a fiber optic telecommunications system with a minimal or reduced number of line regenerators. The costs to purchase, install, and maintain line regenerators in a fiber optic telecommunications transmission line often run into the millions of dollars, especially in Wavelength Division Multiplexing ("WDM") systems that include multiple optical telecommunications channels and optical signals that each require a line regenerator.

A further technical advantage of the present invention includes the capability to operate older fiber optic cable, which was manufactured in such a manner that high PMD is experienced during use, at a higher bandwidth and data rate required of today's fiber optic telecommunications systems. This provides substantial cost savings by eliminating or delaying the need to replace such fiber optic cable with newer fiber optic cable with lower PMD.

Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which.

DETAILED DESCRIPTION

Figure 1:
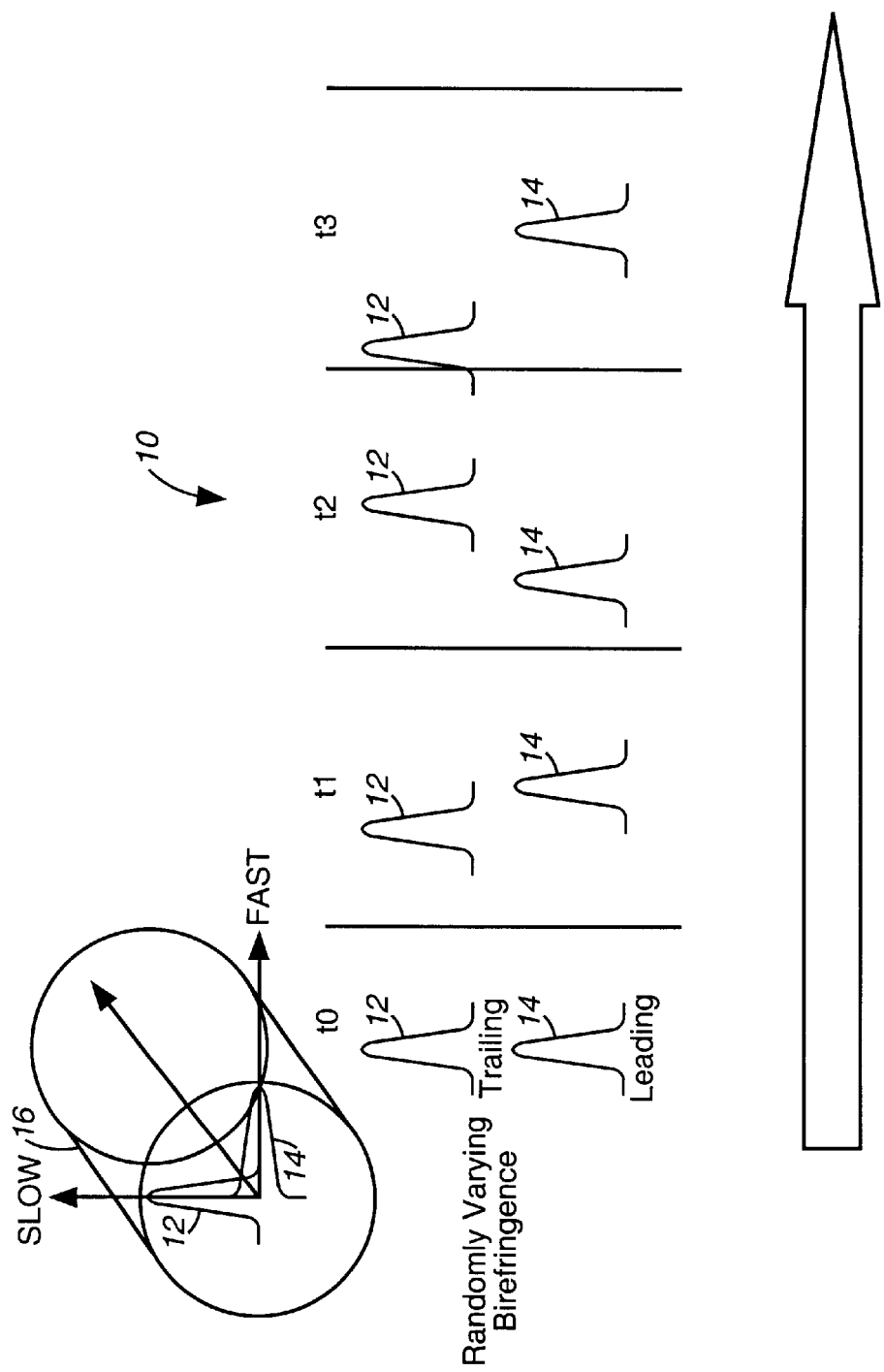
FIG. 1 is a timing diagram that illustrates the two principal states of polarization and the Differential Group Delay ("DGD") caused by birefringence in an optical fiber.

It should be understood at the outset that although an exemplary implementation of the present invention is illustrated below, the present invention may be implemented using any number of techniques, whether currently known or in existence. The present invention should in no way be limited to the exemplary implementations, drawings, and techniques illustrated below, including the exemplary design and implementation illustrated and described herein. FIG. 1 is a timing diagram 10 that illustrates the two principal states of polarization of an optical signal, which include a trailing or slow polarization signal 12 and a leading or fast polarization signal 14, and the Differential Group Delay ("DGD") caused by birefringence in an optical fiber. An optical fiber segment or portion 16 is also shown in FIG. 1 that illustrates both the trailing polarization signal 12 and the leading polarization signal 14. DGD is a first order effect of Polarization Mode Dispersion ("PMD") caused by birefringence in an optical fiber. Higher order effects of PMD are created by randomly varying birefringence in an optical fiber. As will be illustrated, the present invention solves not only the first order effect of PMD, but also solves some of the various other negative effects of PMD that constrain or limit the overall bandwidth of a fiber optic transmission system, such as the effects caused by randomly varying birefringence in an optical fiber.

An optical signal, such as an optical telecommunications signal transmitted through an optical fiber, may be polarized. A polarized optical signal may be expressed in terms of its two principal states of polarization. The two principal states of polarization may be expressed as two polarization signals on orthogonal axes that are normal to the axis of propagation of the optical signal.

As an optical signal or beam of light propagates through an optical fiber, the presence of birefringence in the optical fiber may result in the two polarization signals, such as the trailing polarization signal 12 and the leading polarization signal 14, propagating at different speeds. This results in DGD and may seriously impair the overall bandwidth capabilities of a fiber optic transmission system and significantly increase the Bit Error Rate ("BER").

An optical fiber with randomly varying birefringence introduces additional negative PMD effects that include mode coupling, which is a phenomenon in which light in one polarization mode or state transfers its energy into the other polarization mode or state. This occurs because the principal states of polarization of an optical signal are continually being realigned or reoriented because of the randomly varying birefringence. The principal states of polarization of an optical signal align or adjust to the orientation of the refractive index of the optical fiber. As this changes, as in an optical fiber with randomly varying birefringence, the principal states of polarization of the optical signal are continually being realigned or reoriented.

An optical fiber with randomly varying birefringence may be thought of as an optical fiber made of multiple segments or portions, such as the optical fiber segment 16. Each of these multiple segments or portions of optical fiber function as a separate wave plate, each with its own optical properties, such as birefringence. This results in the relative propagation speed of the two polarization signals being continually adjusted and changed and the two polarization signals being continually realigned or reoriented for each such segment or wave plate. Thus, not only is the speed of each of the two polarization signals being continually changed from one segment or wave plate to another, but the principal states of polarization are continually being reoriented or realigned. This negative effect of PMD also results in a distortion of the output optical signal, which ultimately reduces the overall bandwidth and increases the BER.

The trailing polarization signal 12 and the leading polarization signal 14 of FIG. 1 are shown at an initial point in time to, where both polarization signals are shown in phase, and three successive periods of time as the optical signal propagates through an optical fiber that has randomly varying birefringence. At time $t_1$, the trailing signal 12 is shown trailing or behind the leading polarization signal 14 because of the effects of birefringence. At $t_2$, the trailing polarization signal 12 is shown leading or advancing in front of the leading polarization signal 14. In effect, the trailing polarization signal 12 is no longer trailing the leading polarization signal 14, as was the case at time $t_i$, but is instead leading. At time $t_3$, the effects of the randomly varying birefringence of the optical fiber have resulted in the leading polarization signal 14 once again advancing in front of the trailing polarization signal 12. An optical receiver that receives this optical signal would likely have a difficult time distinguishing between the various pulses of the input optical signal because of the randomly varying birefringent effects or PMD.

Figure 2:
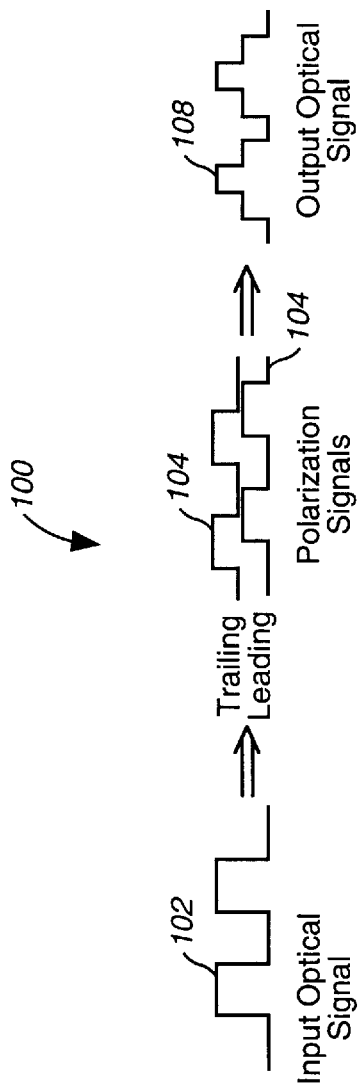
FIG. 2 is an optical signal diagram that illustrates the DGD effects caused by Polarization Mode Dispersion ("PMD") on an input optical signal.

FIG. 2 is an optical signal diagram that illustrates the DGD effects caused by PMD on an input optical signal 102. The input optical signal 102 is shown having two pulses and is introduced into an optical fiber of a fiber optic transmission system. The two polarization signals or states of the input optical signal 102 are shown after the DGD effects of PMD have been introduced. A trailing polarization signal 104 is shown trailing a leading polarization signal 106. If the optical signal is then received by an optical receiver, the output optical signal is distorted, which potentially results in erroneous data detection and errors.

An output optical signal 108 is shown as the sum of the trailing polarization signal 104 and the leading polarization signal 106. As can be seen, the output optical signal 108 becomes distorted, when compared to the input optical signal 102, and the two pulses become spread or widened. The convergence of the two pulses render data detection difficult and often impossible. Although the various pulses of the signals illustrated in FIG. 2 are shown as square waves, these pulses may in fact be provided in any number of other configurations and the corners of such signals may be rounded or curved as opposed to being square.

Figure 3:
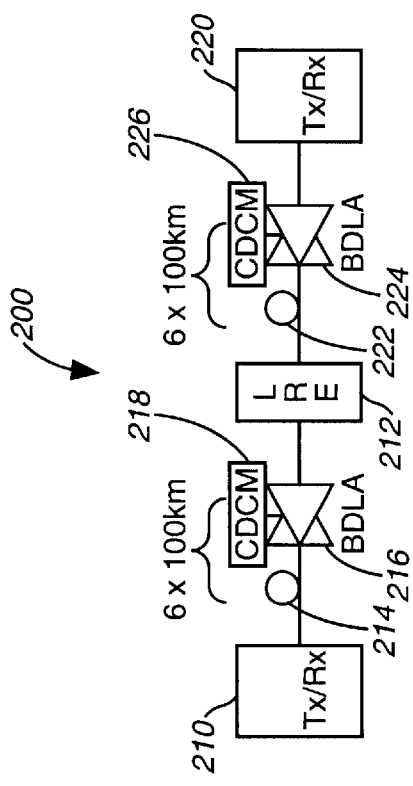
FIG. 3 is a block diagram of a fiber optic transmission system of a telecommunication system.

FIG. 3 is a block diagram of a fiber optic transmission system 200 of a telecommunications system. The fiber optic transmission system 200 is shown implemented as a bidirectional long distance system having various fiber optic channels in each direction. The fiber optic transmission system 200 will preferably be implemented as a Wavelength Division Multiplexing ("WDM") system to increase its overall bandwidth. The fiber optic transmission system 200 may be implemented as a 10 Gbps system, such as an Optical Carrier level 192 ("OC-192") rate or system in which each channel is a Synchronous Optical NETwork ("SONET") that operates at 9.6 Gbps. At these optical data rates and above, PMD and DGD become limiting factors. In fact, PMD and DGD can become limiting factors at much lower data rates, depending upon the amount and variability of the birefringence present in the optical fiber of the fiber optical transmission system. Although FIG. 3 illustrates the fiber optic transmission system as an optical transmission system operating at a SONET rate of OC-192, it should be understood that the present invention may be implemented at virtually any optical data rate.

The fiber optic transmission system 200 includes a transmitter/receiver 210 coupled with a line regenerator 212 through an optical fiber transmission line 214. The line regenerator 212 will generally also include a transmitter/receiver, along with a variety of other telecommunications equipment needed to reconstruct the optical signals for transmission. The line regenerator 212 receives incoming optical pulses from an optical signal and converts them to electrical pulses of an electrical signal. The line regenerator 212 then "cleans up" the electrical pulses and converts them back to optical pulses so that they may be transmitted through the optical fiber transmission line, such as the optical fiber transmission line 214.

The line regenerator 212 of the fiber optic transmission system 200 will generally be required every 600 kilometers or so. In the absence of the present invention, the line regenerator 212 will be required in much more frequent intervals. As discussed above, line regenerators are expensive and significantly add to the overall cost of a fiber optic transmission system. The ability to minimize or eliminate, in some cases, the need for line regenerators is extremely beneficial and advantageous. The present invention, as will be explained more fully below, provides this significant advantage.

A BiDirectional Line Amplifier ("BDLA") 216 is shown between the transmitter/receiver 210 and the line regenerator 212. The BDLA 216 also includes a Chromatic Dispersion Compensation Module ("CDCM") 218 to provide compensation for the negative effects of chromatic dispersion. Generally, in an OC-192 system, such as the fiber optic transmission system 200, a BDLA will be required approximately every 100 kilometers. A BDLA is less expensive than a line regenerator and, unlike a line regenerator, only one BDLA is required for each channel of a WDM system. Conversely, a line regenerator, such as the line regenerator 212, is required for each channel in a WDM system. This significantly increases the cost of line regenerators in a WDM system and further increases the need to minimize the number of line regenerators.

The transmitter/receiver 210 will generally be implemented as part of Line Terminating Equipment ("LTE"), not expressly labeled in FIG. 3. The transmitter/receiver 210 may also include a Polarization Mode Dispersion Compensator ("PMDC") integrated as part of the transmitter/receiver 210 or the PMDC may be implemented separately. The PMDC is not shown in FIG. 3. Generally, a PMDC will be associated with each receiver, such as a receiver in the transmitter/receiver 210. The PMDC, of course, compensates for the negative effects of PMD, such as the first order effect DGD.

The portion of the fiber optic transmission system 200 between the line regenerator 212 and a transmitter/receiver 220 is essentially the same as that just described for the portion of the system between the line regenerator 212 and the transmitter/receiver 210. The transmitter/receiver 220, similar to the transmitter/receiver 210, will generally be implemented as part of an associated LTE. The optical path between the line regenerator 212 and the transmitter/receiver 220 is provided through an optical fiber transmission line 222.

This may include, for example, 12 individual optical fibers so that six channels of bidirectional information may be exchanged between line regenerator 212 and the transmitter/receiver 220. A BDLA 224, with a CDCM 226, will generally also be provided every 100 kilometers. The notation "6×100 km" of FIG. 3 indicates that six bidirectional fiber spans of 100 km are provided in the exemplary implementation of the fiber optic transmission system 200 and a BDLA is provided every 100 km of optical fiber transmission line.

Just as with the transmitter/receiver 210 and the line regenerator 212, a PMDC will generally be provided or associated with each receiver of the fiber optic transmission system 200. This means that a PMDC will be associated with the receiver in the line regenerator 212 and the receiver in the transmitter/receiver 220. Once again, the PMDC provides compensation for the negative effects of PMD. By compensating for these negative effects of PMD, the number of required line regenerators will be minimized. If the PMD is not compensated for, a line regenerator may be required, for example, every 200 kilometers or less. As can be seen, this will significantly increase the overall cost to build, operate and maintain the fiber optic transmission system 200.

In operation, an electrical signal is received at either the transmitter/receiver 210 or the transmitter/receiver 220 and is converted into a corresponding optical signal, such as an OC-192 optical signal. The optical signal is then transmitted through an optical fiber transmission line, such as the optical fiber transmission line 214 or the optical fiber transmission line 222. The optical signal will generally be amplified along the path of the optical fiber transmission line, such as by a BDLA. In one embodiment, the chromatic dispersion effects of the optical fiber transmission line may be compensated for through a CDCM provided for either in association with a BDLA or separate from a BDLA.

Once the optical signal reaches the line regenerator 212, it is received by a receiver of the line regenerator 212. Before this, however, a Polarization Mode Dispersion Compensator ("PMDC") or a Differential Group Delay Compensator ("DGDC") provided separately or as part of a PMDC, identifies the delay or time difference between a leading polarization signal and a trailing polarization signal of the optical signal. After identifying this delay, one or both of the polarization signals may have their wavelength or frequency translated by an amount based on the delay or time difference between these two polarization signals.

The leading and trailing polarization signals are then introduced into an optical fiber, such as a dispersion compensating fiber with a known chromatic dispersion group delay property that is provided as part of or in association with the PMDC of DGDC, to more closely align the two polarization signals. This, in effect, compensates not only for the adverse effects of DGD, but also for various other negative effects of PMD. The optical fiber will generally be provided as a high chromatic dispersion fiber that, preferably, can provide chromatic dispersion in a range between 80–120

This optical fiber will generally have a low birefringence and may be referred to as dispersion compensating fiber. Further, the relationship between the group delay from chromatic dispersion as it varies with wavelength or frequency, will be known for this optical fiber and this information will, preferably, be used to determine by how much and in what direction to translate the wavelength or frequency of one or more of the polarization signals.

After the PMDC compensates for the negative PMD effects, the line regenerator 212 receives the signal, regenerates it, and transmits it through the other optical fiber transmission line. Ultimately, the optical signal is received at the opposite transmitter/receiver. At such time, the PMDC associated with the receiver of the transmitter/receiver performs the same compensation just described for the PMDC associated with the line regenerator 212.

Figure 4:
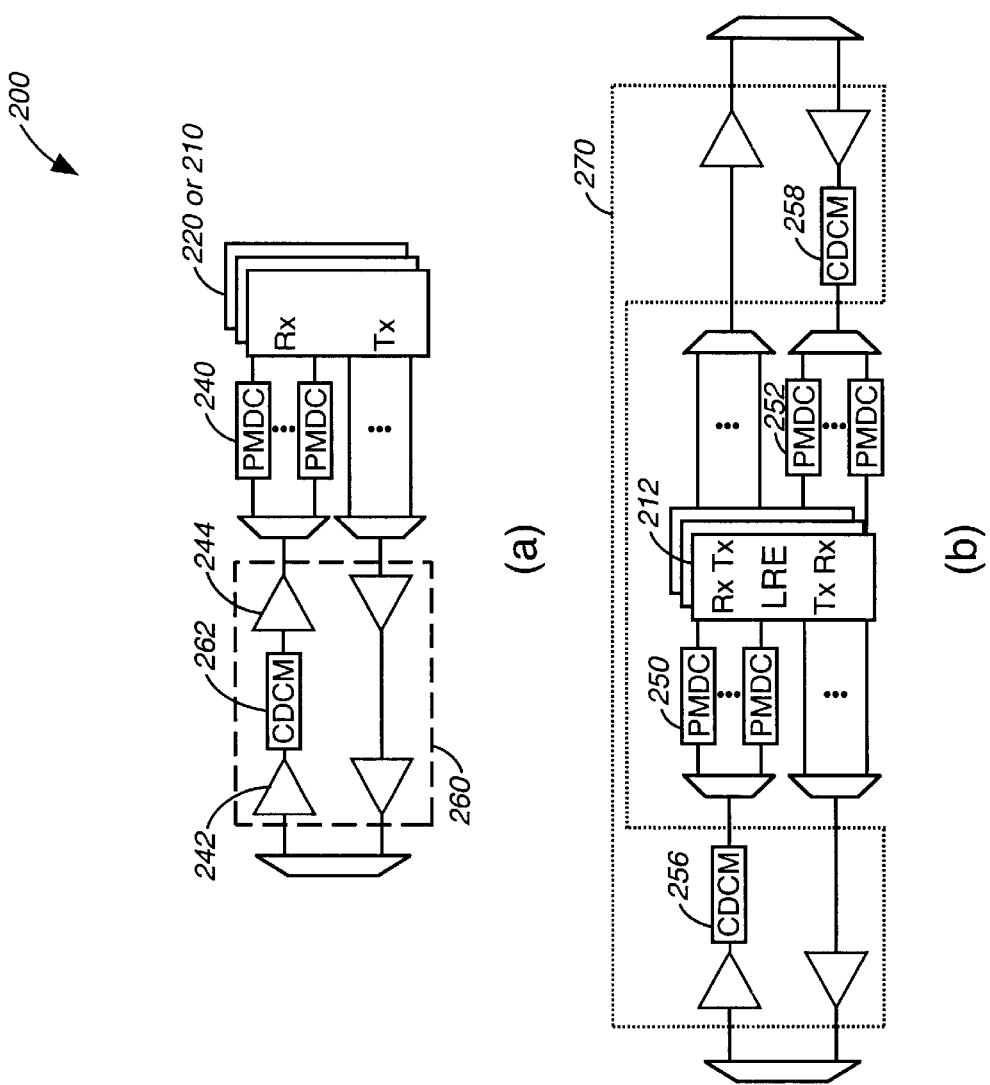
FIGS. 4A and 4B are expanded block diagram of the fiber optic transmission system that illustrates one embodiment of how a Polarization Mode Dispersion Compensator ("PMDC") may be implemented and associated with a receiver of a transmitter/receiver and a line regenerator in a Wavelength Division Multiplexing ("WDM") system.

FIG. 4 is an expanded block diagram of the fiber optic transmission system 200 that illustrates one embodiment of how the PMDC may be implemented and associated with the receivers of the transmitter/receiver 210, the transmitter/receiver 220, and the line regenerator 212 in a WDM system. FIG. 4 also illustrates an exemplary implementation of a transmitter/receiver amplifier 260 that may be provided as part of or in association with either the transmitter/receiver 210 or the transmitter/receiver 220, and an exemplary implementation of a transmitter/receiver amplifier 270 that may be provided as part of or in association with the line regenerator 212. The transmitter/receiver amplifier 260 and 270 may be implemented similar to a BDLA, such as those discussed above in connection with FIG. 3.

The expanded view of the interconnection of the receiver of the transmitter/receiver 220 or 210 of the fiber optic transmission system 200 and the various PMDCs associated with each channel, such as PMDC 240, is illustrated in (a) of FIG. 4. An expanded view of the transmitter/receiver amplifier 260 of the fiber optic transmission system 200 is also shown in (a) of FIG. 4. Each of the PMDCs, such as the PMDC 240, are provided on a per channel basis and are associated with the receiver of the transmitter/receiver 220 or 210. Unlike a PMDC, the transmitter/receiver amplifier 260 and BDLAs, not shown in FIG. 4, are provided in a WDM network or system across multiple channels. Thus, only one transmitter/receiver amplifier 260, and hence CDCM, is required for all of the channels. For example, the transmitter/receiver amplifier 260 provides amplification to all of the channels in both directions of the WDM system of the fiber optic transmission system 200. Similarly, in a preferred embodiment, a CDCM is provided at an amplification point, such as transmitter/receiver amplifier 260, before a PMDC, such as PMDC 240. This allows chromatic dispersion to be corrected first at the CDCM and then allows polarization mode dispersion, such as differential group delay, to be corrected before the optical signal is received at a receiver. For discussion purposes, it is assumed that an optical signal is being provided through the transmitter/receiver amplifier 260, the PMDC 240, and then received at the receiver of transmitter/receiver 220.

In operation, an optical signal is received at the transmitter/receiver amplifier 260 and is amplified by an amplifier 242. Next, the chromatic dispersion is corrected or compensated for in a CDCM 262. The transmitter/receiver amplifier 260 may then amplify the signal again at an amplifier 244 to produce an optical signal that has been chromatic dispersion compensated. The optical signal may then be provided, on a per channel basis, to a PMDC such as the PMDC 240. The PMDC 240, provides polarization mode dispersion compensation or control according to the present invention. The optical signal is then received at the receiver of the transmitter/receiver 220 so that it may then be ultimately converted into an equivalent or corresponding electrical signal for use in a telecommunications system. As was mentioned above, the various PMDCs may be integrated with a transmitter/receiver of an LTE or may be provided separately or in association with such equipment.

An optical signal that is transmitted by the transmitter of transmitter/receiver 220 is not initially provided to a PMDC. The optical signal is amplified by the amplifiers of the transmitter/receiver amplifier 260, without any chromatic dispersion compensation.

The expanded view of the interconnection of the receiver of the line regenerator 212 and various PMDCs of the fiber optic transmission system 200 is illustrated in (b) of FIG. 4. An expanded view of the exemplary implementation of the transmitter/receiver amplifier 270 that may be provided as part of or in association with the line regenerator 212 is also shown in (b) of FIG. 4. The line regenerator 212 provides a transmitter/receiver pair for signals traveling in each direction. For example, the transmitter/receiver amplifier 270 may receive and amplify a signal and then provide chromatic dispersion correction in a CDCM such as a CDCM 256. Once again, this may be accomplished on or across multiple optical communications channels. The optical signal is then provided to a PMDC 250 so that PMD compensation and DGD compensation may be provided to the optical signal before it is received by one of the receivers of the transmitter/receiver pair of the line regenerator 212 that is used to provide optical signal regeneration in the direction that this optical signal is traveling. A PMDC must be provided for each optical signal channel.

The PMDC 250 provides PMD and DGD compensation so that the receiver of the line regenerator 212 may receive an accurate signal so that the signal may be accurately regenerated. The optical signal is then transmitted by the transmitter of the transmitter/receiver pair and provided back to an optical fiber transmission line.

In operation, an optical signal traveling from right to left in (b) of FIG. 4 will be received by the transmitter/receiver amplifier 270 and amplified. The optical signal is amplifed and the chromatic dispersion present in the optical signal is then compensated or controlled through a CDCM 258. Next, the signal is demultiplexed and travels on a per channel basis to a PMDC 252 so that the PMD and DGD may be compensated, controlled, or corrected. The corresponding receiver of a transmitter/receiver pair receives the signal and provides line regeneration. The signal is then provided back to the optical fiber transmission line through the transmitter of the transmitter/receiver pair.

Figure 5:
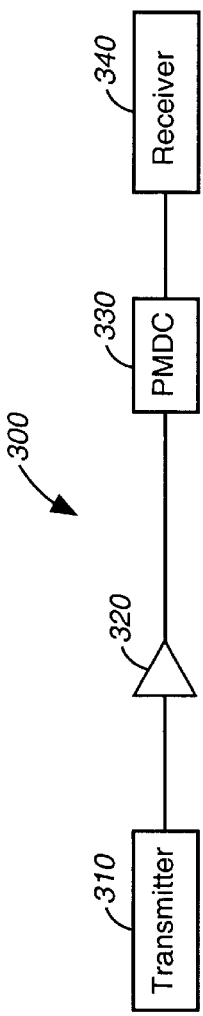
FIG. 5 is a block diagram of one channel of a fiber optic transmission system.

FIG. 5 is a block diagram of one channel of a fiber optic transmission system 300. The channel includes a transmitter 310, an amplifier 320, a PMDC 330, and a receiver 340. An optical signal travels through the channel of the fiber optic transmission system 300 after being transmitted by the transmitter 310. The optical signal is then amplified by the amplifier 320. In other embodiments, the amplifier 320, similar to the amplifiers discussed previously with respect to FIGS. 3 and 4, may provide chromatic dispersion compensation. Depending on the length of the optical fiber transmission line of the fiber optic transmission system 300, multiple amplifiers, similar to the amplifier 320 may be provided.

The optical signal is then received at the PMDC 330 so that the PMD and DGD may be compensated or corrected. The PMDC 330 provides a polarization dispersion compensated optical signal or a differential group delay compensated optical signal to the receiver 340. One embodiment of the PMDC 330 is shown in more detail in FIG. 6 and is discussed more fully below. The receiver 340 receives the signal and provides it to other portions of a telecommunications system. If the receiver 340 is implemented as part of a line regenerator, the optical signal is converted to an electrical signal and then converted back to an optical signal so that it may be provided to other parts of the fiber optic transmission system.

Figure 6:
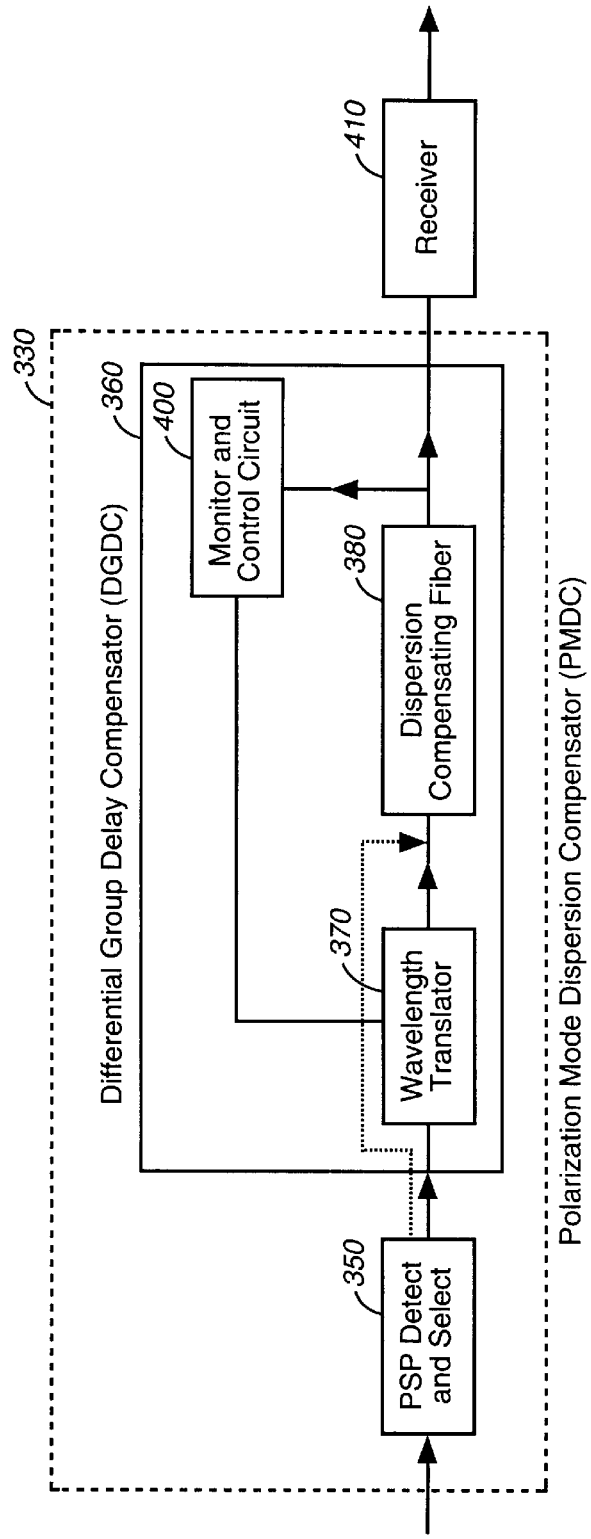
FIG. 6 is a block diagram of an exemplary PMDC according to one embodiment of the present invention.

FIG. 6 is a block diagram of an exemplary PMDC 330 according to one embodiment of the present invention. Generally, the PMDC 330 includes a Principal State of Polarization ("PSP") detect and select module 350 and a Differential Group Delay Compensator ("DGDC") 360. The output of the PMDC 330 is then provided to a receiver 410.

The PSP detect and select module 350 receives an incoming optical signal and detects the alignment, orientation, or state of its polarization. The two principal states of polarization are identified. At this point, a leading polarization signal is identified and a trailing polarization signal is identified. The two polarization signals are delayed relative to each other because of DGD. The identification of the two principal states of polarization may also be thought of as an alignment or orientation of the two principal states of polarization, which may also be provided by the PSP detect and select module 350.

The PSP detect and select module 350 then determines the delay between the two polarization signals and selects one or the other to provide to the wavelength translator 370 of the DGDC 360. In one embodiment, the PSP detect and select module 350 may be implemented as a polarization controller with feedback that identifies the leading and trailing polarization signals and selects one or both of them, the separation of the leading and trailing polarization signals may be achieved, in one embodiment, by using a polarization beam splitter.

The PSP detect and select module 350 may select either the leading or the trailing polarization signal to provide to a wavelength translator 370 of the DGDC 360. This selection may be predefined, predetermined, or manually established. In still other embodiments, an algorithm may be developed to consider various factors, such as the amount of DGD and/or the optical properties of a dispersion compensating fiber 380 of the DGDC 360, to determine which of the polarization signals should be selected. Preferably, one of the leading or the trailing polarization signal is predefined to be provided to the wavelength translator 370 of the DGDC 360. In still other embodiments, the PSP detect and select module 350 may provide one of the polarization signals to the wavelength translator 370 and the other polarization signal to another wavelength translator of DGDC not shown in FIG. 6.

Once the delay or time difference between the two polarization signals is known, both the leading and trailing polarization signals are communicated to DGDC 360. DGDC 360 compensates or controls the delay between the two polarization signals so that it may produce an output signal with a reduced, minimized, or optimized amount of DGD that is within the acceptable tolerances of the receiver 410. In this manner, various optical pulses may be accurately detected and read by the receiver 410. This reduces the overall BER and increases the overall bandwidth of a fiber optic transmission system.

The DGDC 360 may include the wavelength translator 370, the dispersion compensating fiber 380, and a monitor and control circuit 400 to provide feedback and control to the wavelength translator 370. In an alternative embodiment of the DGDC 360, two wavelength translators are provided. In this manner, both the leading and the trailing polarization signals can have their wavelengths or frequencies translated. These two translated polarization signals may then be combined and introduced to the dispersion compensating fiber 380 to take advantage of the known chromatic dispersion group delay introduced by the dispersion compensating fiber 380 to minimize or reduce the DGD of the optical signal.

In the embodiment of DGDC 360 shown in FIG. 6, either the leading or trailing polarization signal is provided to the wavelength translator 370 while the other polarization signal is provided at the output of the wavelength translator 370. These output signal of the wavelength translator 370 and the other polarization signal may then be combined and provided as an input to the dispersion compensating fiber 380.

In an alternative embodiment, a second dispersion compensating fiber is provided with the same or similar dispersion characteristics as the dispersion compensating fiber 380. In such an embodiment, the polarization signal that was not wavelength translated is provided to the second dispersion compensating fiber at a time near or simultaneous to when the translated polarization signal is provided from the output of the wavelength translator 370 to the dispersion compensating fiber 380. The output of the second dispersion compensating fiber and the dispersion compensating fiber 380 may then be combined to generate a differential group delay compensated optical signal.

The signals may be combined using virtually any available technology such as a polarization beam splitter, which is not or is minimally wavelength or frequency sensitive based on the differences in wavelength or frequency between the leading and trailing polarization signals. The circuitry and equipment needed to combine polarization signals may be included as a separate element or module of the PMDC 330 or as part of the DGDC 360.

Assuming that the PSP detect and select module 350 provides the trailing polarization signal to the wavelength translator 370, the leading polarization signal is provided at the output of the wavelength translator 370. The wavelength translator 370, based on the delay between the leading and trailing polarization signals and/or based on the chromatic dispersion or group delay characteristics of the dispersion compensating fiber 380, changes or translates the wavelength or frequency of the trailing polarization signal by a certain amount to generate a translated trailing polarization signal.

Once the wavelength or frequency of the trailing polarization signal is adjusted, the wavelength translator 370 provides the translated trailing polarization signal to the dispersion compensating fiber 380. Before the dispersion compensating fiber 380 receives the translated trailing polarization signal, the translated trailing polarization signal will preferably be combined with the leading polarization signal, as indicated by the dotted line.

The dispersion compensating fiber 380 will, preferably, be provided as a high chromatic dispersion fiber that has low birefringence and has low PMD at a set length. The dispersion compensating fiber 380, however, may be provided in virtually any available configuration and having any of a variety of optical properties. This is because the optical signal that is received will contain the two principal states of polarization that are at different wavelengths or frequencies because of the wavelength translation that took place in the wavelength translator 370. The amount of the wavelength or frequency difference between the two polarization signals, however, will be such that the two polarization signals may still be combined before entering the dispersion compensating fiber 380. As this optical signal travels through the dispersion compensating fiber 380, its two polarization signals should begin to come into alignment with one another. The dispersion compensating fiber 380 allows its chromatic dispersion group delay properties to adjust or advance the trailing polarization signal such that it is either directly aligned with the leading polarization signal or at such a point that the differential group delay is within the tolerances of the receiver 410. This is significantly and fundamentally different from past or known techniques, which used different methods and required the leading polarization signal to be delayed relative to the trailing polarization signal.

In another embodiment, the PSP detect and select module 350 selects and communicates the leading polarization signal to the wavelength translator 370 and provides the trailing polarization signal to the output of the wavelength translator 370. At this point, the trailing polarization signal and the wavelength translated leading polarization signal may be combined and provided as an input to the dispersion compensating fiber 380. In such a case, the wavelength translator 370 uses the delay between the two polarization signals and the chromatic dispersion properties of the dispersion compensating fiber 380 to translate or adjust the wavelength or frequency of the leading polarization signal.

The dispersion compensating fiber 380 then allows its chromatic dispersion properties to adjust the two polarization signals such that they are either directly aligned or within the tolerances of the receiver 410. The translated leading polarization signal is delayed relative to the trailing polarization signal in order to align these two polarization signals. The tolerances of the receiver 410 may, for example in an optical signal that includes 100 ps pulses, which is around 10 Gbps for an OC-192 data rate, 30 to 40 ps.

In yet another embodiment, the PSP detect and select module 350 may provide one of the polarization signals to the wavelength translator 370 and the other polarization signal to another wavelength translator, not shown in FIG. 6. In this manner, both polarization signals may have their wavelengths or frequencies translated such that a wavelength translated trailing polarization signal is generated and a wavelength translated leading polarization signal are generated. These two signals are then combined before being provided to the dispersion compensating fiber 380. It should also be understood that the PSP detect and select module 350 may provide such information as the amount of differential group delay to one or both wavelength translators. The dispersion compensating fiber 380 then allows its known chromatic dispersion group delay effects to adjust the two polarization signals such that an optical signal is provided at its output that falls within the tolerances of the receiver 410.

The wavelength translator 370 may be implemented using any of a variety of known techniques, circuitry, and equipment. For example, in one embodiment, the wavelength translator may be implemented using a laser diode amplifier that receives a continuous wave optical signal as one input and one of the polarization signals as the other input. In this manner, the wavelength or frequency of the polarization signal may be modulated or changed to any desired wavelength or frequency. The dispersion compensating fiber 380 may be implemented using virtually any optical fiber, such as an optical fiber with a known chromatic dispersion and a low birefringence. In general, the higher the chromatic dispersion of the dispersion compensating fiber 380, the required amount or length of fiber is reduced. Stated differently, a higher chromatic dispersion fiber allows a greater DGD to be corrected with a reduced length of dispersion compensating fiber. Smaller length fiber is often desirable for cost, size reduction advantages and less optical loss.

The monitor and control circuit 400 detects the delay between the two principal polarization states of the output of the dispersion compensating fiber 380, which may be referred to as a differential group delay compensated optical signal. The monitor and control circuit 400 then provides an error signal back to the wavelength translator 370 so that adjustments may be made in the wavelength or frequency translation so that the DGD or delay between the two polarization signals of the differential group delay compensated optical signal may be minimized or reduced. In effect, the error signal determines whether the wavelength or frequency has been translated too much or not enough. The monitor and control circuit 400 may be implemented using circuitry and techniques similar to the PSP detect and select module 350.

The PMDC 330 and the DGDC 360 provide substantial advantages over other techniques that often involve either fixed or mechanically variable optical delay lines that use polarization maintaining fiber. The DGDC 360 of the present invention provides superior accuracy and reliability. It should be understood that the various modules and functions performed by the PMDC 360 and the DGDC 360 may be arranged and implemented in a variety of other configurations to achieve the same functionality as is covered by the present invention.

Figure 7:
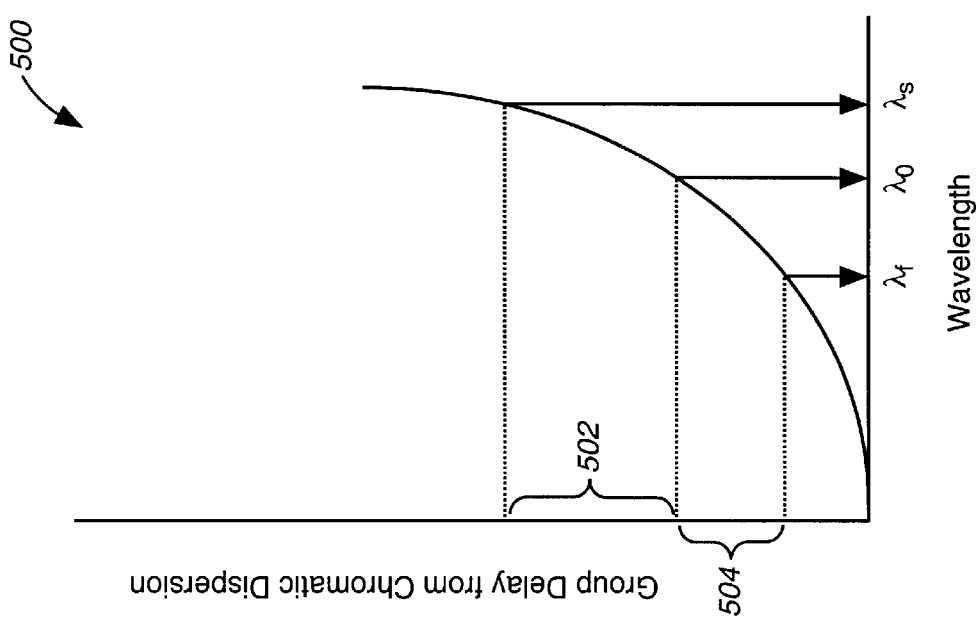
FIG. 7 is a graph illustrating exemplary chromatic dispersion group delay properties of a dispersion compensating fiber.

FIG. 7 is a graph 500 illustrating exemplary chromatic dispersion properties, such as group delay chromatic dispersion, of the dispersion compensating fiber 380. The graph 500 illustrates the relationship between a change in wavelength (or frequency) of a polarization signal and the corresponding change in group delay from chromatic dispersion introduced by the dispersion compensating fiber 380.

Chromatic dispersion is wavelength dependent as is illustrated by the graph 500. Depending on the amount of group delay present between two polarization signals, the wavelength translator 370 of the DGDC 360 shown in FIG. 6 may adjust the wavelength of either the leading or trailing polarization signal by an amount that will correspond to a group delay from chromatic dispersion to more closely align the two polarization signals, thus reducing PMD and DGD. For example, if a polarization signal is provided that has a wavelength $\lambda_o$, a corresponding change in wavelength to $\lambda_s$ will result in a change shown on the y-axis of graph 500 by an amount 502. Similarly, if the wavelength is reduced to an amount $\lambda_f$, as shown, the group delay from chromatic dispersion is a change shown on the y-axis of graph 500 by an amount 504.

It should also be understood that the change in wavelength by the wavelength translator 370 and the subsequent introduction of the optical signal to the dispersion compensating fiber 380 not only results in a group delay of a certain amount of time, but also in either direction, that is, the polarization signal that has been wavelength translated, can be either sped up or advanced or slowed down in time relative to the other polarization signal or mode. For example, a trailing polarization signal would be advanced in time to more closely correspond with the leading polarization signal, while the leading polarization signal may be delayed in time to more closely correspond with the trailing polarization signal.

Figure 8:
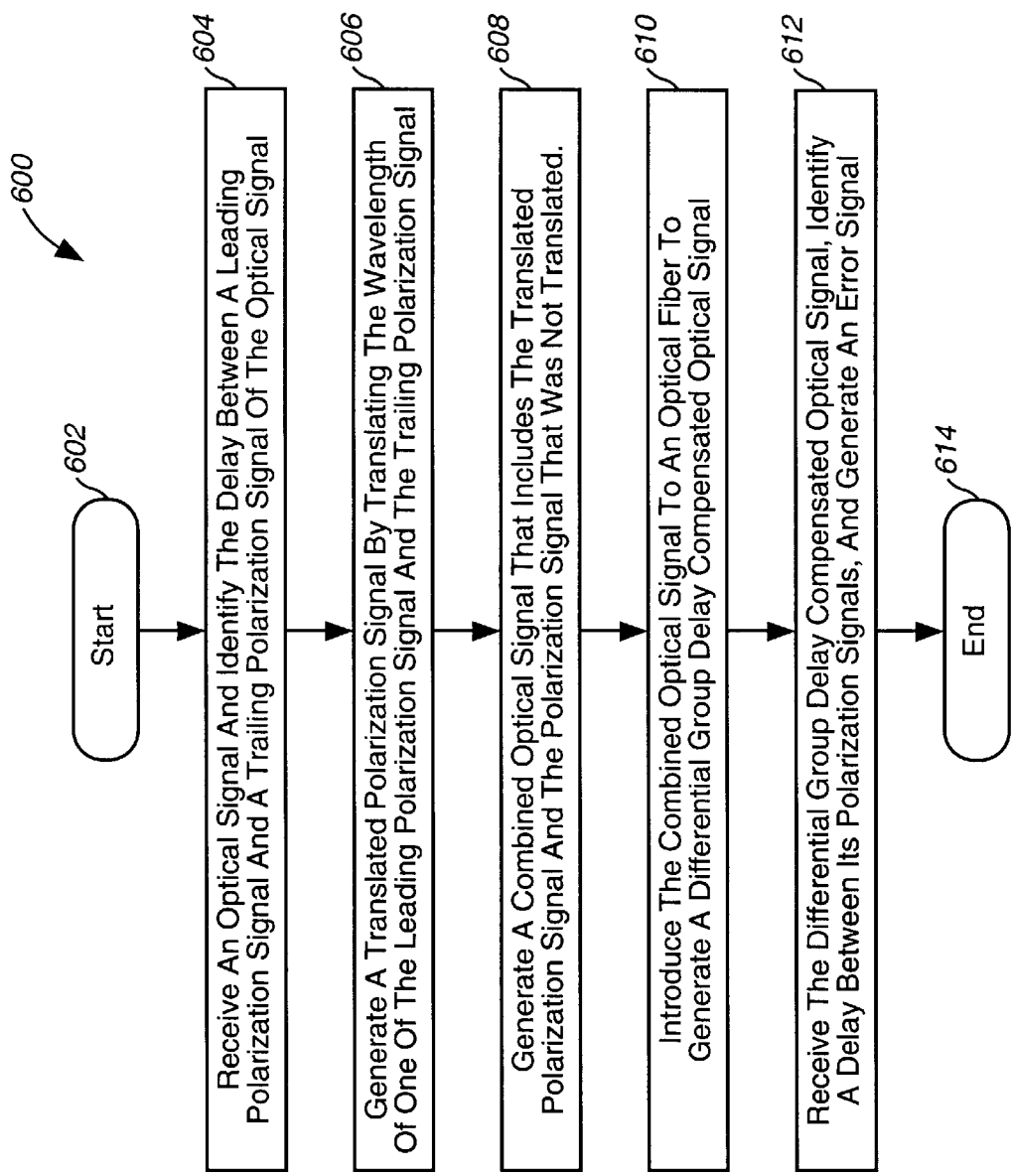
FIG. 8 is a flowchart that illustrates a method for differential group delay compensation of an optical signal.

FIG. 8 is a flowchart that illustrates a method 600 for differential group delay compensation of an optical signal. Method 600 begins at 602 and proceeds to block 604 where the optical signal is received and analyzed. The delay or DGD between a leading polarization signal and a trailing polarization signal of the optical signal is determined or identified.

One or both of the leading and trailing polarization signals are selected to have its wavelength (or frequency) translated, as discussed in the next block. The selection may be predefined or predetermined such that one or both of the polarization signals are selected. Alternatively, one or both of the polarization signals may be selected either as a predefined default, a manual default, or as a result of an algorithm used to select one or both of the polarization signals. In a preferred embodiment, only one of the leading and trailing polarization signals is selected.

The method 600 proceeds next to block 606 to generate a translated polarization signal by translating the wavelength or frequency of one of the leading polarization signal and the trailing polarization signal. The amount and direction of the translation of the wavelength may be related to the delay or DGD determined in block 604.

The amount and direction of the translation of the wavelength may also be related to the optical property or properties of an optical line, discussed more fully below in connection with block 610. This will generally include the optical property of group delay or chromatic dispersion group delay that varies with wavelength. This allows a wavelength dependent optical property, such as chromatic dispersion group delay, to be utilized to ultimately delay the leading polarization signal and/or advance the trailing polarization signal. Preferably, the wavelength will be translated by an amount that is related to both the delay or DGD determined in block 604 and one or more optical properties of the optical line. As will also be discussed more fully below, an error signal may also be generated and provided as an input at this block 606. The error signal may also serve to adjust the amount and direction of the translation of one or both of the polarization signals.

Referring still to block 606, in one embodiment the leading polarization signal is the translated polarization signal. In another embodiment the trailing polarization signal is the translated polarization signal. In yet another embodiment, both the trailing polarization signal and the leading polarization signal have their wavelength or frequency translated to generate a first translated polarization signal and a second polarization signal, respectively. The present preferred embodiment is the translation of either the leading polarization signal or the trailing polarization signal.

The method 600 proceeds next to block 608 to generate a combined optical signal that, preferably, includes the translated polarization signal and the polarization signal that was not translated. For example the leading polarization signal may have had its wavelength translated in block 606, while the trailing polarization signal was not wavelength translated. Block 608 would include combining the wavelength translated leading polarization signal and the trailing polarization signal. In the event that both the leading and trailing polarization signals were wavelength translated, both of these translated signals would be combined in block 608 to generate the combined optical signal. This may be achieved by any of a variety of means such as a polarization beam splitter.

At block 610, the method 600 proceeds to introduce the combined optical signal to an optical fiber, such as a dispersion compensating optical fiber, to take advantage of one or more of the optical properties of the optical fiber to delay or advance the translated polarization signal of the combined optical signal. Preferably, the chromatic dispersion group delay properties of the optical fiber will be used to delay or advance the translated polarization signal of the combined optical signal. The chromatic dispersion group delay of the optical fiber varies with wavelength. The output of the optical fiber generates a differential group delay compensated optical signal. The differential group delay compensated optical signal may then be provided to an optical receiver of a fiber optic transmission system.

In one embodiment of block 610, the trailing polarization signal is the translated polarization signal, and the translated polarization signal of the combined optical signal advances relative to the leading polarization signal due to the chromatic dispersion group delay of the optical line. In another embodiment, the leading polarization signal is the translated polarization signal, and the translated polarization signal is delayed relative to the trailing polarization signal due to the chromatic dispersion group delay of the optical line. In an alternative embodiment, both the leading and the trailing polarization signals are wavelength translated in block 606, and both are adjusted accordingly due to the chromatic dispersion group delay of the optical line to generate the differential group delay compensated optical signal. The differential group delay compensated optical signal results in a signal compensates or minimizes the effects of PMD and DGD.

The method 600 proceeds next to block 612 where an error signal is generated. The error signal is related to the amount of delay or DGD still present in the differential group delay compensated optical signal. The delay of DGD is the time difference between the two polarization signals of the differential group delay compensated optical signal. This error signal may then be used in the block 606 to assist with translating the wavelength of one or both of the leading polarization signal and the trailing polarization signal of the optical signal. The method 600 ends at block 614.

Thus, it is apparent that there has been provided, in accordance with the present invention, a system and method for differential group delay compensation that accurately, reliably, as compared to prior techniques, compensates for differential group delay caused by birefringence and randomly varying birefringence, and that satisfies one or more of the advantages set forth above. Although the preferred embodiment has been described in detail, it should be understood that various changes, substitutions, and alterations can be made herein without departing from the scope of the present invention, even if all of the advantages identified above are not present. For example, the system may be implemented using various different hardware and algorithms. Also, the techniques, systems, sub-systems, and methods described and illustrated in the preferred embodiment as discrete or separate may be combined or integrated with other systems, modules, techniques, or methods without departing from the scope of the present invention. Other examples of changes, substitutions, and alterations are readily ascertainable by one skilled in the art and could be made without departing from the spirit and scope of the present invention.

What is claimed is:

1. A differential group delay compensator comprising:
   a wavelength translator operable to translate the wavelength of one of a leading polarization signal and a trailing polarization signal of an optical signal by an amount related to the delay between the leading polarization signal and the trailing polarization signal to generate a translated polarization signal; and
   a dispersion compensating fiber operable to receive a combined optical signal that includes the translated polarization signal and the polarization signal of the optical signal that did not have its wavelength translated by the wavelength translator and to generate a differential group delay compensated optical signal.

2. The differential group delay compensator of claim 1, wherein the trailing polarization signal is the translated polarization signal.

3. The differential group delay compensator of claim 1, wherein the leading polarization signal is the translated polarization signal.

4. The differential group delay compensator of claim 1, further comprising:
   a polarization beam splitter operable to receive and combine two polarization signals to generate the combined optical signal.

5. The differential group delay compensator of claim 1, wherein the trailing polarization signal is the translated polarization signal, and wherein the dispersion compensating fiber advances the translated polarization signal relative to the leading polarization signal to generate the differential group delay compensated optical signal.

6. The differential group delay compensator of claim 1, wherein the leading polarization signal is the translated polarization signal, and wherein the dispersion compensating fiber delays the translated polarization signal relative to the trailing polarization signal to generate the differential group delay compensated optical signal.

7. The differential group delay compensator of claim 1, wherein the dispersion compensating fiber is a high dispersion fiber.

8. The differential group delay compensator of claim 1, wherein the dispersion compensating fiber has the optical property of chromatic dispersion group delay that varies with optical wavelength.

9. The differential group delay compensator of claim 1, further comprising:
   a monitor and control circuit operable to monitor and identify a differential group delay in the differential group delay compensated optical signal and to generate an error signal related to the differential group delay in the differential group delay compensated optical signal, and wherein the wavelength translator is operable to receive the error signal and to translate the wavelength of a polarization signal by an amount related to the error signal.

10. A differential group delay compensator comprising:
    a first wavelength translator operable to translate the wavelength of a leading polarization signal of an optical signal by an amount related to the delay between the leading polarization signal and a trailing polarization signal of the optical signal to generate a translated leading polarization signal;
    a second wavelength translator operable to translate the wavelength of the trailing polarization signal by an amount related to the delay between the leading polarization signal and the trailing polarization signal to generate a translated trailing polarization signal; and
    a dispersion compensating fiber operable to receive a combined optical signal that includes the translated leading polarization signal and the translated trailing polarization signal and to generate a differential group delay compensated optical signal.

11. A polarization mode dispersion compensator comprising:
    a principal state of polarization detect and select module operable to identify a differential group delay in an optical signal that includes a leading polarization signal and a trailing polarization signal and to select at least one of the leading polarization signal and the trailing polarization signal; and
    a differential group delay compensator that includes:
       a wavelength translator operable to translate the wavelength of the polarization signal selected by the principal state of polarization detect and select module by an amount related to the differential group delay to generate a translated polarization signal; and
       a dispersion compensating fiber operable to receive a combined optical signal that includes the translated polarization signal and the polarization signal of the optical signal not selected by the principal state of polarization detect and select module and to generate a differential group delay compensated optical signal.

12. The polarization mode dispersion compensator of claim 11, wherein the trailing polarization signal is the translated polarization signal.

13. The polarization mode dispersion compensator of claim 11, wherein the leading polarization signal is the translated polarization signal.

14. The polarization mode dispersion compensator of claim 11, wherein the differential group delay compensator further includes:

a polarization beam splitter operable to receive and combine two polarization signals to generate the combined optical signal.

15. The polarization mode dispersion compensator of claim 11, wherein the trailing polarization signal is the translated polarization signal, and wherein the dispersion compensating fiber advances the translated polarization signal relative to the leading polarization signal to generate the differential group delay compensated optical signal.

16. The polarization mode dispersion compensator of claim 11, wherein the leading polarization signal is the translated polarization signal, and wherein the dispersion compensating fiber delays the translated polarization signal relative to the trailing polarization signal to generate the differential group delay compensated optical signal.

17. The polarization mode dispersion compensator of claim 11, wherein the dispersion compensating fiber is a high dispersion fiber.

18. The polarization mode dispersion compensator of claim 11, wherein the differential group delay compensator further includes:
a monitor and control circuit operable to monitor and identify a differential group delay in the differential group delay compensated optical signal and to generate an error signal related to the differential group delay in the differential group delay compensated optical signal, and wherein the wavelength translator is operable to receive the error signal and to translate the wavelength of a polarization signal by an amount related to the error signal.

19. A polarization mode dispersion compensator comprising:
a principal state of polarization detect module operable to identify a differential group delay in an optical signal that includes a leading polarization signal and a trailing polarization signal; and
a differential group delay compensator that includes:
a first wavelength translator operable to translate the wavelength of the leading polarization signal of an optical signal by an amount related to the differential group delay to generate a translated leading polarization signal;
a second wavelength translator operable to translate the wavelength of the trailing polarization signal by an amount related to the differential group delay to generate a translated trailing polarization signal; and
a dispersion compensating fiber operable to receive a combined optical signal that includes the translated leading polarization signal and the translated trailing polarization signal and to generate a differential group delay compensated optical signal.

20. A fiber optic transmission system comprising:
a transmitter operable to transmit an optical signal;
an optical fiber transmission line operable to receive the optical signal from the transmitter and to propagate the optical signal;
a differential group delay compensator that includes:
a wavelength translator operable to translate the wavelength of one of a leading polarization signal and a trailing polarization signal of the optical signal by an amount related to the delay between the leading polarization signal and the trailing polarization signal to generate a translated polarization signal; and
a dispersion compensating fiber operable to receive a combined optical signal that includes the translated polarization signal and the polarization signal of the optical signal that did not have its wavelength translated by the wavelength translator and to generate a differential group delay compensated optical signal; and
a receiver operable to receive the differential group delay compensated optical signal.

21. The fiber optic transmission system of claim 20, wherein the differential group delay compensator is positioned in proximity to the receiver.

22. The fiber optic transmission system of claim 20, wherein the optical transmission rate is OC-192.

23. The fiber optic transmission system of claim 20, wherein the optical transmission rate is greater than OC-192.

24. A fiber optic transmission system comprising:
a transmitter operable to transmit an optical signal;
an optical fiber transmission line operable to receive the optical signal from the transmitter and to propagate the optical signal;
a polarization mode dispersion compensator that includes
a principal state of polarization detect and select module operable to identify a differential group delay in an optical signal that includes a leading polarization signal and a trailing polarization signal and to select at least one of the leading polarization signal and the trailing polarization signal; and
a differential group delay compensator that includes:
a wavelength translator operable to translate the wavelength of the polarization signal selected by the principal state of polarization detect and select module by an amount related to the differential group delay to generate a translated polarization signal; and
a dispersion compensating fiber operable to receive a combined optical signal that includes the translated polarization signal and the polarization signal of the optical signal not selected by the principal state of polarization detect and select module and to generate a differential group delay compensated optical signal; and
a receiver operable to receive the differential group delay compensated optical signal.

25. A method for differential group delay compensation of an optical signal comprising:
generating a translated polarization signal by translating the wavelength of at least one of a leading polarization signal and a trailing polarization signal of the optical signal by an amount related to a delay between the leading polarization signal and the trailing polarization signal; and
introducing the translated polarization signal to an optical fiber with the optical property of group delay that varies with wavelength to generate a differential group delay compensated optical signal.

26. The method of claim 25, further comprising:
identifying the delay between the leading polarization signal and the trailing polarization signal of the optical signal before generating a translated polarization signal.

27. The method of claim 25, wherein the trailing polarization signal is the translated polarization signal.

28. The method of claim 25, wherein the leading polarization signal is the translated polarization signal.

29. The method of claim 25, wherein the trailing polarization signal is the translated polarization signal, and further comprising:
generating a second translated polarization signal by translating the wavelength of the leading polarization signal by an amount related to the delay between the leading polarization signal and the trailing polarization signal; and introducing the second translated optical signal to the optical fiber.

30. The method of claim 29, further comprising:

combining the translated polarization signal and the second translated polarization signal to generate a combined optical signal so that the translated polarization signal and the second translated polarization signal are introduced into the optical fiber as the combined optical signal.

31. The method of claim 30, wherein the combining the translated polarization signal and the second translated polarization signal is achieved using a polarization beam splitter.

32. The method of claim 25, further comprising:

combining the translated polarization signal and the one of the leading polarization signal and the trailing polarization signal that was not translated to generate a combined optical signal so that the translated polarization signal is introduced into the optical fiber with the combined optical signal.

33. The method of claim 25, further comprising:

identifying the delay between the leading polarization signal and the trailing polarization signal; and selecting one or both of the leading polarization signal and the trailing polarization signal to be translated.

34. The method of claim 25, wherein the trailing polarization signal is the translated polarization signal and the translated polarization signal and the leading polarization signal are introduced to the optical fiber, and wherein the translated polarization signal advances relative to the leading polarization signal.

35. The method of claim 25, wherein the leading polarization signal is the translated polarization signal and the translated polarization signal and the trailing polarization signal are introduced to the optical fiber, and wherein the translated polarization signal is delayed relative to the trailing polarization signal.

36. The method of claim 25, wherein the delay is the time difference between the leading polarization signal and the trailing polarization signal.

37. The method of claim 25, wherein the translated polarization signal is generated by translating the wavelength of at least one of the leading polarization signal and the trailing polarization signal by an amount related to both the delay between the leading polarization signal and the trailing polarization signal, and the dispersion characteristics of the optical fiber.

38. The method of claim 25, wherein the optical fiber is a dispersion compensating fiber.

39. The method of claim 25, wherein the optical fiber is a high dispersion fiber.

40. The method of claim 25, further comprising:

communicating the differential group delay compensated optical signal to an optical receiver.

41. The method of claim 25, wherein the delay between a leading polarization signal and a trailing polarization signal represents differential group delay.

42. The method of claim 25, further comprising:

receiving the differential group delay compensated optical signal and generating an error signal related to the differential group delay in the differential group delay compensated optical signal.

43. The method of claim 42, further comprising:

generating a translated polarization signal by translating the wavelength of at least one of a leading polarization signal and a trailing polarization signal of the optical signal by an amount related to a delay between the leading polarization signal and the trailing polarization signal and by an amount related to the error signal.

* * * * *